(12) United States Patent
Fujiwara et al.

(10) Patent No.: US 7,780,929 B2
(45) Date of Patent: Aug. 24, 2010

(54) FLUID MIXING APPARATUS AND FLUID MIXING METHOD

(75) Inventors: Takayuki Fujiwara, Minami-Ashigara (JP); Kazuo Okutsu, Minami-Ashigara (JP)

(73) Assignee: FUJIFILM Corporation, Tokyo (JP)

( * ) Notice: Subject to any disclaimer, the term of this patent is extended or adjusted under 35 U.S.C. 154(b) by 619 days.

(21) Appl. No.: 11/727,816

(22) Filed: Mar. 28, 2007

(65) Prior Publication Data

US 2007/0231226 A1    Oct. 4, 2007

(30) Foreign Application Priority Data

Mar. 28, 2006    (JP) ............... 2006-089294

(51) Int. Cl.
*B01J 19/00* (2006.01)
*B01J 8/02* (2006.01)
*B01F 5/06* (2006.01)

(52) U.S. Cl. .............. 422/224; 422/103; 422/211; 422/220; 366/336; 366/340; 366/341

(58) Field of Classification Search .............. 422/224, 422/103, 99, 211, 220; 366/336, 340, 341
See application file for complete search history.

(56) References Cited

U.S. PATENT DOCUMENTS

| 6,637,463 B1 | 10/2003 | Lei et al. |
| 2002/0185183 A1 | 12/2002 | O'Connor et al. |
| 2004/0022690 A1 | 2/2004 | Kawai et al. |
| 2004/0213083 A1* | 10/2004 | Fujiwara et al. ............ 366/336 |

FOREIGN PATENT DOCUMENTS

| EP | 1 391 237 A2 | 2/2004 |
| EP | 1 473 077 A2 | 11/2004 |
| JP | 10-267468 A | 10/1998 |
| JP | 2004-243308 A | 9/2004 |
| JP | 2005-288254 A | 10/2005 |

OTHER PUBLICATIONS

EP Communication, dated Jun. 3, 2009, issued in corresponding EP Application No. 07006243.5, 7 pages.
Rainer Schenk, et al "Numbering-Up of Micro Devices: A First Liquid-Flow Splitting Unit" Chemical Engineering Journal 101 (2004) 421-429.

* cited by examiner

*Primary Examiner*—Walter D Griffin
*Assistant Examiner*—Lessanework Seifu
(74) *Attorney, Agent, or Firm*—Sughrue Mion, PLLC (57) ABSTRACT

The present invention provides a fluid mixing apparatus having a numbering-up mechanism that distributes plural kinds of fluids and concurrently performs multiple mixing or reactions, comprising: a rectifying section having a plurality of annular channels that rectify the plural kinds of fluids into respective concentric annular flows; a distribution section having a plurality of distribution channels that distribute the plural kinds of fluids rectified by the rectifying section into a plurality of flows; a converging section having a plurality of converging channels that converge different kinds of fluids among the plural kinds of fluids distributed by the distribution section; and a mixing/reaction section having a plurality of mixing/reaction channels that cause mixing or reaction of the plural kinds of fluids converged by the converging section, wherein a plurality of pressure loss increasing devices are provided in the distribution channels.

13 Claims, 9 Drawing Sheets

FLUID MIXING APPARATUS AND FLUID MIXING METHOD

BACKGROUND OF THE INVENTION

1. Field of the Invention

The present invention relates to a fluid mixing apparatus and a fluid mixing method, and more particularly to a fluid mixing apparatus and a fluid mixing method for distributing a fluid at a uniform flow rate in branch portions of a channel in the fluid mixing apparatus. More particularly, the present invention relates to a fluid mixing method for uniformly distributing a fluid to increase yields in a fluid mixing apparatus of numbering-up type including an increased number of units (referred to as microreactors) for precise chemical reactions or mixing.

2. Description of the Related Art

Micro space provides a large surface area per unit volume, allowing many reaction interfaces of reaction fluids to be formed and facilitating temperature control, which receives attention as a technique for increasing efficiency or velocity of reactions or mixing between fluids.

Generally, a microreactor that performs reactions or mixing while precisely controlling fluids in micro space has low throughput. Increasing the size of channels in the microreactor to increase the capacity and thus increase throughput, however, causes loss of basic functions (for example, of forming a laminar flow, or the like) specific to the microreactor. For this reason, various studies have been made on a numbering-up technique for increasing the number of channels.

In order to achieve precise chemical reactions in a microreactor, precise control of a flow rate is important. "Numbering-up of micro device: a first liquid-flow splitting unit (Chemical Engineering Journal 101 (2004) 421-429)" discloses an example in which a unit for splitting a liquid flow is provided upstream of a microreactor to split the liquid flow to the microreactor with tubes. With this method, however, variations in head pressure caused by placement of the tubes or variations in inner diameters of the tubes may cause flow resistance. Also, chips of sealing materials in connectors of the tubes may enter microchannels to block the channels. Bubbles of air trapped between the tubes and the connectors may cause variations in flow rate.

In order to achieve numbering-up more efficiently in a microreactor including a channel of a branch structure, reaction fluids need to be uniformly distributed to provide a uniform ratio of flow rates of the reaction fluids in each channel.

Japanese Patent Application Laid-Open No. 2004-243308 discloses a microchannel structure of numbering-up type, including a circularly recessed storage space for temporarily storing a fluid introduced halfway through a channel, and linear supply channels formed radially from the storage space. This proposes uniformly passing the fluid through each microchannel using the storage space as a buffer to prevent nonuniform pressure of the fluid.

Japanese Patent Application Laid-Open No. 10-267468 proposes a heat exchanger including, before distribution chambers, a main channel and distribution holes each having a diameter smaller than that of the main channel, thereby providing a pressure loss. Thus, a heat exchange fluid passes through the main channel and is distributed to the distribution chambers through the distribution holes, thereby allowing the fluid to uniformly flow into each distribution chamber and increasing heat exchange effectiveness.

SUMMARY OF THE INVENTION

The conventional method, however, is still insufficient to uniformly distribute a fluid, and uniform and stable mixing or reaction cannot be performed in microchannels.

Also, a fluid easily accumulates in a buffer such as the storage space in Japanese Patent Application Laid-Open No. 2004-243308 or the distribution chamber in Japanese Patent Application Laid-Open No. 10-267468. Thus, it is difficult to uniformly distribute the fluid to all channels by the fluid pushing air in the channels at the start of passing the fluid (removal of air), or to remove air bubbles trapped during operation from the buffer or channels communicating with the buffer (removal of air bubbles).

This prevents continuous stable operation, and also requires time for starting the operation or cleaning after the operation, which increases losses of a reaction fluid or a cleaning fluid.

The method including the buffer is generally inappropriate for a fluid having a quality degrading with time.

The present invention is achieved in view of these circumstances, and has an object to provide a fluid mixing apparatus and a fluid mixing method that can increase uniform distribution properties of fluids in numbering-up and air bubble removing properties in channels to allow uniform and stable mixing or reaction to be performed.

In order to achieve the above described object, a first aspect of the present invention provides a fluid mixing apparatus having a numbering-up mechanism that distributes plural kinds of fluids and concurrently performs multiple mixing or reactions, including: a rectifying section having a plurality of annular channels that rectify the plural kinds of fluids into respective concentric annular flows; a distribution section having a plurality of distribution channels that distribute the plural kinds of fluids rectified by the rectifying section into a plurality of flows; a converging section having a plurality of converging channels that converge different kinds of fluids among the plural kinds of fluids distributed by the distribution section; and a mixing/reaction section having a plurality of mixing/reaction channels that cause mixing or reaction of the plural kinds of fluids converged by the converging section, wherein pressure loss increasing devices are provided in the distribution channels.

According to the first aspect, the pressure loss increasing devices that increase pressure losses of the rectified plural kinds of fluids are provided in the plurality of distribution channels in the distribution section, thereby allowing the plural kinds of fluids to be uniformly distributed into the converging section. The different kinds of fluids among the uniformly distributed plural kinds of fluids are converged to be mixed or react in the respective mixing/reaction channels, thereby allowing uniform and stable mixing or reaction to be concurrently performed in the mixing/reaction channels.

The pressure loss increasing device is not limited as long as it is a device for increasing the pressure loss in the distribution channel, and includes, for example, an orifice structure or a structure increasing the length of the distribution channel.

In a second aspect of the present invention, the converging section and the mixing/reaction section are integrally formed according to the first aspect.

According to the second aspect, the fluid mixing apparatus can be made compact.

In a third aspect of the present invention, the pressure loss in the distribution channel is the highest among all the channels that constitute the fluid mixing apparatus according to the first or second aspect.

According to the third aspect, the pressure loss in the distribution channel is the highest among all the channels that constitute the fluid mixing apparatus, thereby allowing the fluids to be more uniformly distributed. The pressure loss in the distribution channel is set so that the sum of the pressure losses of all the channels that constitute the fluid mixing apparatus is smaller than a pressure resistance limit of a pump, a pipe, a connector or the like that supplies the fluids.

In a fourth aspect of the present invention, the pressure loss increasing device is an orifice according to any one of the first to third aspects.

This increases uniform distribution properties of the fluids in numbering-up.

In a fifth aspect of the present invention, the distribution section is provided in multiple stages before the converging section, and the distribution number for one distribution is ten or less according to any one of the first to fourth aspects.

According to the fifth aspect, the distribution section is provided in multiple stages to allow free setting of the numbering-up number, but too large a distribution number for one distribution causes accumulating portions to be easily formed. Thus, the distribution number for one distribution is preferably ten or less.

In a sixth aspect of the present invention, the fluid mixing apparatus includes no accumulating portion where the plural kinds of fluids accumulate according to any one of the first to fifth aspects.

According to the sixth aspect, the fluid mixing apparatus forms no accumulating portion, thereby increasing uniform distribution properties of the reaction fluids in numbering-up and air bubble removing properties in the channels to allow uniform and stable mixing or reaction to be performed. The accumulating portion is a portion at which an average flow velocity is one hundredth or less, preferably one tenth or less, and more preferably one half or less of the highest velocity portion in the entire fluid mixing apparatus.

In a seventh aspect of the present invention, a circle equivalent diameter of the microchannel in the mixing/reaction section is 1 mm or less according to any one of the first to sixth aspects.

Thus, the present invention is effective particularly when it is difficult to uniformly distribute the fluids into the plurality of microchannels.

In order to achieve the above described object, an eighth aspect of the present invention provides a fluid mixing method for distributing plural kinds of fluids and concurrently performing multiple mixings or reactions, including the steps of: rectifying the plural kinds of fluids into respective concentric annular flows; distributing the plural kinds of fluids rectified in the rectifying step into a plurality of flows; converging different kinds of fluids among the plural kinds of fluids distributed in the distributing step; and causing mixing or reaction of the plural kinds of fluids converged in the converging step, wherein pressure losses of the plural kinds of fluids are increased in the distributing step.

According to the eighth aspect, the pressure losses are increased in the distributing step of distributing the rectified plural kinds of fluids, thereby allowing the plural kinds of fluids to be uniformly distributed to the converging step. The different kinds of fluids among the plural kinds of fluids uniformly distributed are converged to be mixed or react, thereby allowing uniform and stable mixing or reaction to be concurrently performed.

In a ninth aspect of the present invention, the pressure loss of each of the plural kinds of fluids is the highest when the fluids are distributed into the plurality of flows in the distributing step according to the eighth aspect.

According to the ninth aspect, the fluids can be uniformly distributed to the converging step. The pressure loss in the distribution channel is set so that the sum of the pressure losses of all the channels that constitute the fluid mixing apparatus is smaller than a pressure resistance limit of a pump, a pipe, a connector or the like that supplies fluids.

According to the present invention, uniform distribution properties of the fluids in numbering-up and air bubble removing properties in the channels can be increased to allow uniform and stable mixing or reaction to be performed.

DETAILED DESCRIPTION OF THE PREFERRED EMBODIMENTS

Now, preferred embodiments of a fluid mixing apparatus and a fluid mixing method according to the present invention will be described with reference to the accompanying drawings. A liquid-liquid reaction between liquids L1 and L2 that produces a reaction product LM will be described by way of example, but the present invention is not limited to this.

First Embodiment

Figure 1:
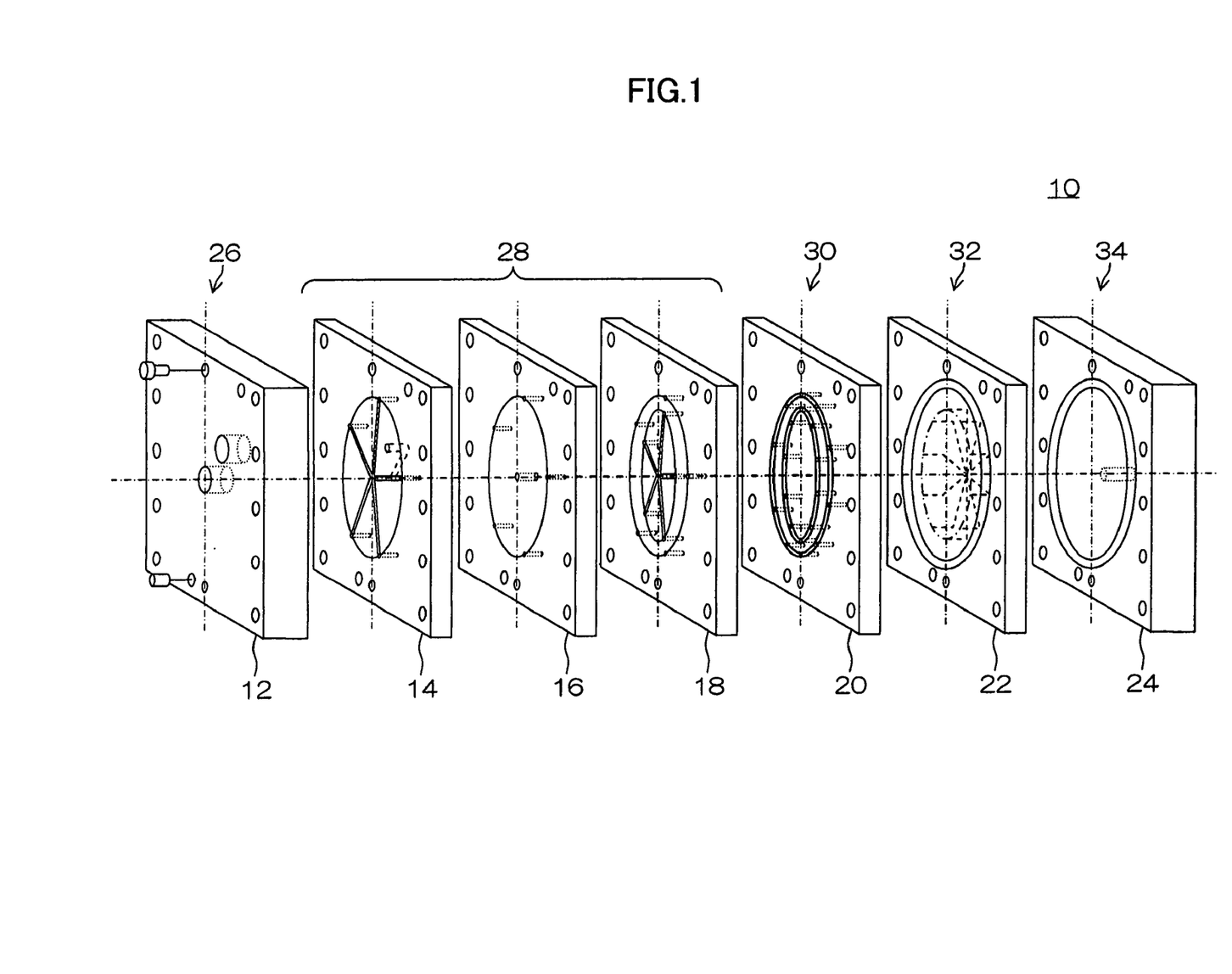
FIG. 1 is an exploded perspective view for illustrating an example of a fluid mixing apparatus according to a first embodiment.

FIG. 1 is an exploded perspective view for illustrating an example of a fluid mixing apparatus (microreactor unit) 10 of numbering-up type according to a first embodiment. Seven parts that constitute the fluid mixing apparatus 10 are herein shown in exploded perspective view. This embodiment will be described by taking an example of a converging section and a mixing/reaction section integrally formed in one plate.

As shown, the fluid mixing apparatus 10 is constituted by at least seven plates 12, 14, 16, 18, 20, 22 and 24 stacked and integrated. The fluid mixing apparatus 10 generally includes an inflow section 26 through which liquids L1 and L2 flow in, a rectifying section 28 that rectifies the flowed-in liquids L1 and L2 into concentric annular flows, a distribution section 30 that distributes the rectified concentric annular flows into a plurality of flows, a mixing/reaction section 32 that converges the distributed liquids L1 and L2 to cause mixing or reaction, and a outflow section 34 through which a liquid LM after the mixing or reaction flows out.

In a central position of the plate 12 of the inflow section 26, a through hole 36 through which the liquid L1 flows in is formed, and in another position of the plate 12, a through hole 38 through which the liquid L2 flows in is formed.

Figure 2A:
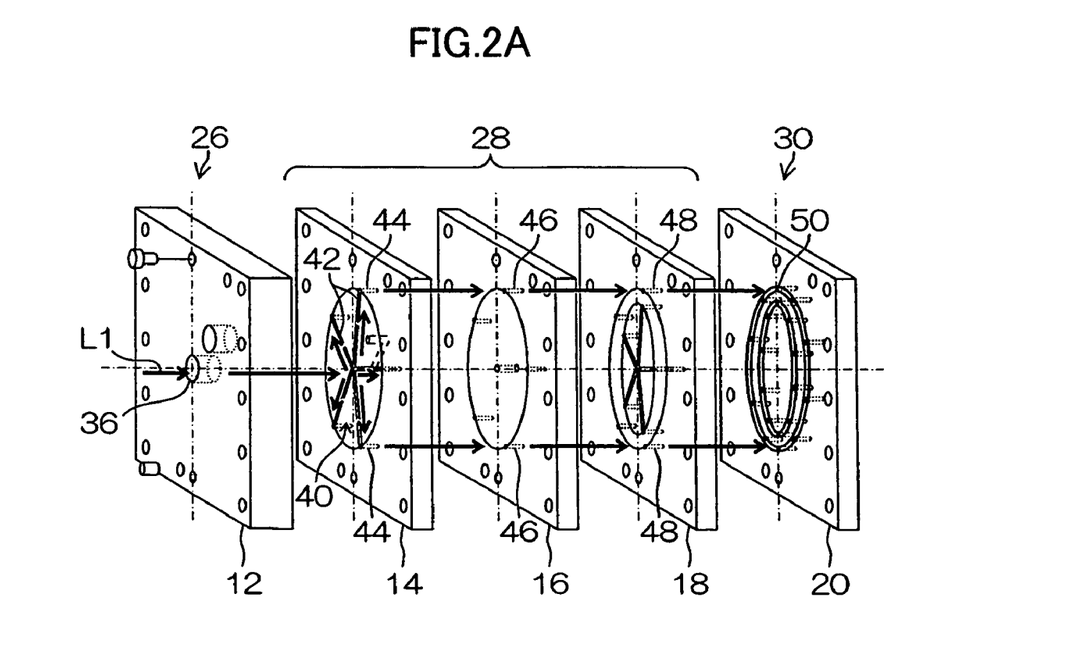
FIGS. 2A and 2B are exploded perspective views for illustrating a rectifying section in the fluid mixing apparatus in FIG. 1.
Figure 2B:
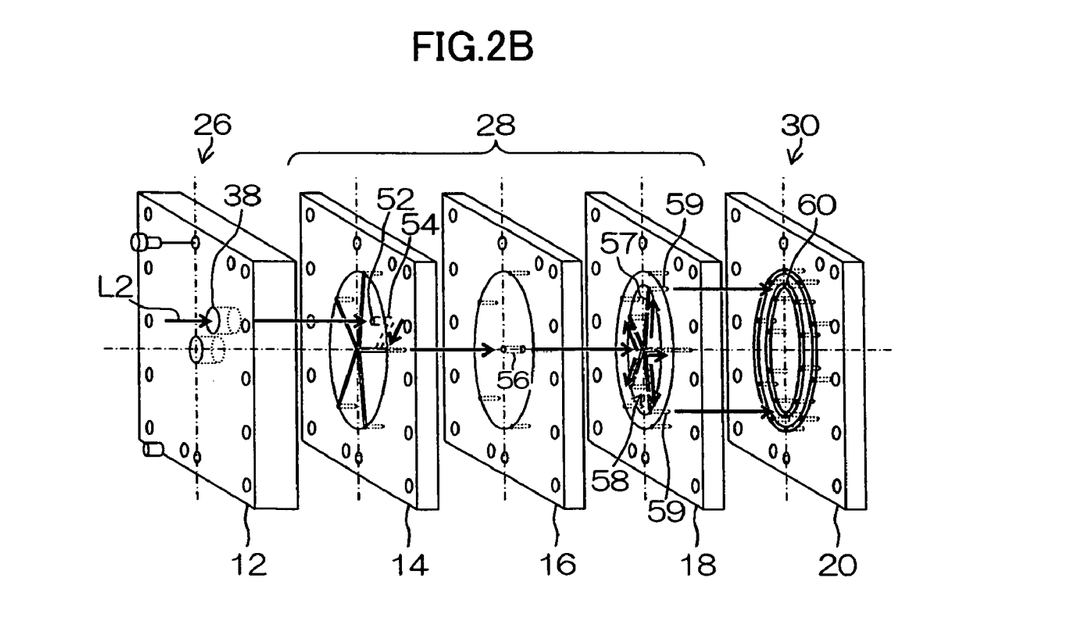

FIGS. 2A and 2B are exploded perspective views for illustrating the rectifying section 28 in the fluid mixing apparatus 10 in FIG. 1, FIG. 2A illustrates a flow of the liquid L1, and FIG. 2B illustrates a flow of the liquid L2.

First, channels for the liquid L1 to flow in the rectifying section 28 will be described. In a surface of the plate 14 facing the inflow section 26, a branch structure channel 40 is formed that divides the liquid L1 having flowed in through the center of the plate 12 into five radial flows. Branch channels 42 of the branch structure channel 40 communicate with respective five through holes 44 ... formed in a thickness direction of the plate 14. The branch structure is symmetric in a flow direction.

Through holes 46 ... and 48 ... are formed in the plates 16 and 18, respectively, so as to communicate with the through holes 44 ... in the plate 14 when the plates are stacked, and further communicate with one concentric annular channel 50 in the plate 20.

Next, channels for the liquid L2 to flow in the rectifying section 28 will be described. As described above, in the surface of the plate 14 facing the inflow section 26, a through hole 52 is formed so as to communicate with the through hole 38, and in a surface facing the plate 16, a channel 54 is formed that communicates with the through hole 52 at the center of the surface.

In a surface of the plate 18 facing the plate 16, a branch structure channel 58 is formed that divides the liquid L2 into five radial flows from the center of the plate 18.

Branch channels 57 of the branch structure channel 58 communicate with respective five through holes 59 ... formed in the thickness direction of the plate 14. The branch structure is symmetric in a flow direction. The five through holes 59 ... are formed inside the through holes 48 ... through which the liquid L1 flows, and communicate with a concentric annular channel 60 concentrically formed inside the concentric annular channel 50 in the plate 20.

The channels of the liquids L1 and L2 are configured to be geometrically symmetric. A circle equivalent diameter in radial sections of the channels and holes formed in the plates 12, 14, 16 and 18 in the rectifying section 28 is preferably 10 mm or less, more preferably 1 mm or less, and further preferably 500 μm or less. The sectional shape of the channel is preferably circular, but not limited to this, and may be rectangular, or V-shaped. In the embodiment, the radial section of each of the branch structure channels 40 and 58 is rectangular with a width of 300 μm and a depth of 300 μm.

In the embodiment, the branch structure channels 40 and 58 each have five branch channels by way of example, but not limited to this. However, too large a branch number for one distribution causes accumulating portions to be easily formed in branch portions of the channels, preventing uniform distribution. Specifically, it is preferable that a microchannel is divided into ten or less radial branch channels, and then a diameter of a circle connecting ends of the branch channels collected at the radial center is less than twice a diameter of the microchannel. On the other hand, it is not preferable that the microchannel is divided into eleven or more radial branch channels, and then a diameter of a circle connecting ends of the branch channels is more than twice the diameter of the microchannel.

Thus, the branch number for one distribution is preferably ten or less for reducing the accumulating portions to a negligible level. The accumulating portion where the liquid accumulates is a portion at which an average flow velocity is one hundredth or less, preferably one tenth or less, and more preferably one half or less of the highest velocity portion in the entire fluid mixing apparatus.

Diameters of the through holes 48 ... and the through holes 59 ... are adjusted to accommodate differences in flow resistance in view of the ratio of flow rates of the liquids L1 and L2 and the lengths of the channels.

In the rectifying section 28 thus configured, the liquid L1 having flowed in through the through hole 36 in the plate 12 is divided into five flows in the branch structure channel 40 formed in the plate 14. Then, the respective flows of the divided liquid L1 flow through the through holes 44, 46 and 48, and then flow into the concentric annular channel 50 formed in the plate 20 to form concentric annular flows.

Similarly, the liquid L2 having flowed in through the through hole 38 in the plate 12 flows through the through hole 52 and the channel 54 formed in the plate 14 and flows out of the center of the plate 14, and flows into the through hole 56 formed at the center of the plate 16. Then, the liquid L2 is divided into five flows in the branch structure channel 58 formed in the plate 18. The respective flows of the divided liquid L2 flow through the through holes 59, and then flow into the concentric annular channel 60 formed in the plate 20 to form concentric annular flows.

Thus, the liquids L1 and L2 having flowed in the inflow section 26 are divided to form the concentric annular flows, thereby allowing stable rectification.

Figure 3:
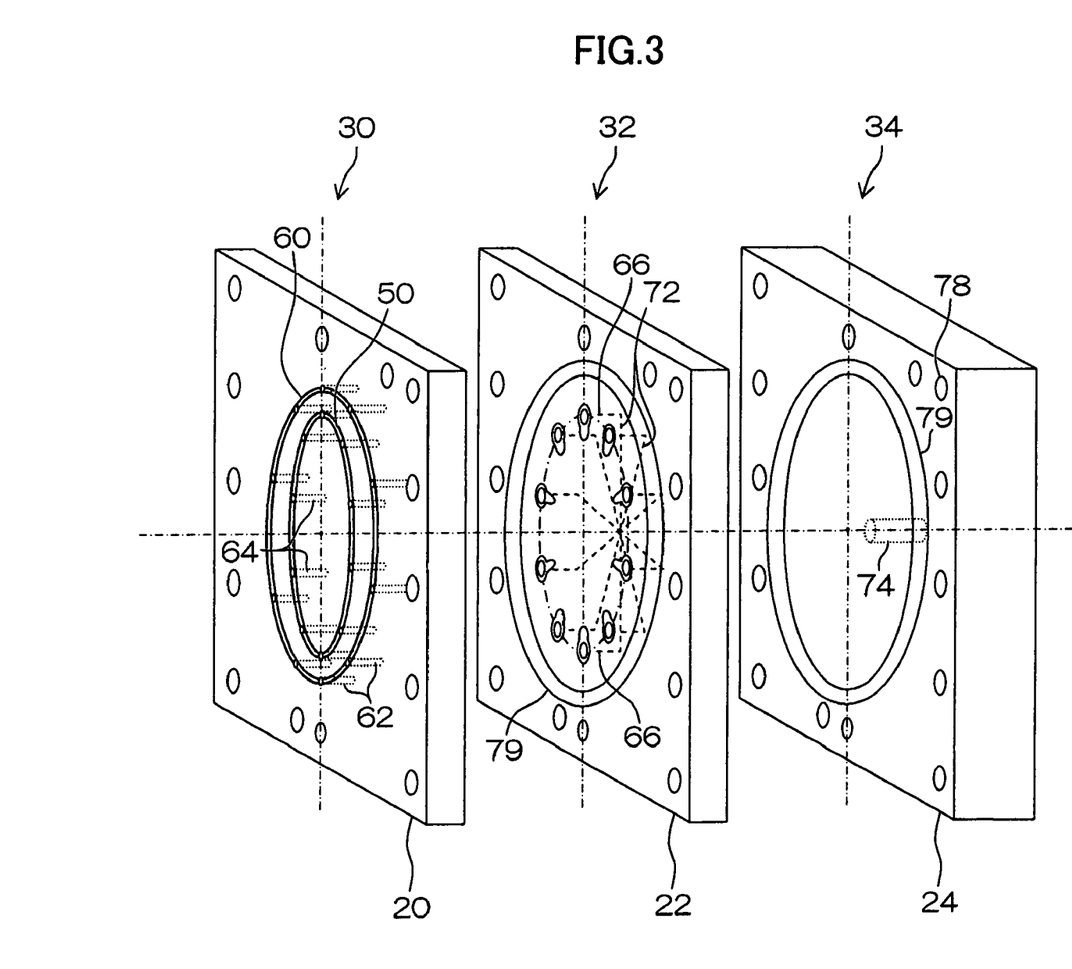
FIG. 3 is a perspective view for illustrating a distribution section, a mixing/reaction section, and an outflow section in the fluid mixing apparatus according to the first embodiment.

FIG. 3 is a perspective view for illustrating a distribution section 30, a mixing/reaction section 32, and an outflow section 34 in the fluid mixing apparatus 10.

The distribution section 30 distributes the two concentric annular flows rectified by the rectifying section 28 into a plurality of flows. Ten distribution holes 62 ... communicate with the annular channel 50 provided in the plate 20 at regular intervals, and ten distribution holes 64 ... communicate with the concentric annular channel 60 at regular intervals.

The through holes 48 ... in the plate 18 are placed in positions corresponding to middle points between the distribution holes 62 ... in the concentric annular channel 60. Similarly, the through holes 59 ... in the plate 18 are placed in positions corresponding to middle points between the distribution holes 64 ... in the concentric annular channel 50. Thus, the structure is geometrically symmetric toward the downstream side.

Orifices are provided in the distribution holes 62 ... and 64 .... A diameter of each orifice is set so that the highest pressure loss is obtained in the orifice among all the channels of the plates that constitute the fluid mixing apparatus 10. The orifices provided in the distribution holes 62 ... and 64 ... allow the two concentric annular flows to be uniformly divided into ten flows.

In view of limits of a high pressure plunger pump, a general pipe joint, or a simple joint, a pressure loss ΔP in the orifice is preferably $1 \times 10^{-6}$ Pa to 10 MPa, more preferably $1 \times 10^{-6}$ Pa to 1 MPa, and further preferably $1 \times 10^{-6}$ Pa to 0.3 MPa.

The pressure loss ΔP is expressed by the following Hagen-Poiseuille equation (1).

$$\Delta P = 32\, \mu L U/D^2 \tag{1}$$

(where μ is a viscosity (Pa·s), L is a channel length (m), U is a flow velocity (m/s), and D is a density (kg/m³)).

In a fluid mixing apparatus including n members, with a pressure loss $\Delta Pn$ in a microchannel of an n-th member, a pressure loss $\Delta Po$ in an orifice formed in the distribution section 30 immediately before the mixing/reaction section 32 is the highest among $\Delta P1$, $\Delta P2$, $\Delta P3$, ... $\Delta Pn$. With all pressure losses $\Delta Pall$ of the fluid mixing apparatus being $\Delta P1+\Delta P2+\Delta P3+\ldots+\Delta Pn$, $\Delta Pall$ is set to be pressure resistance (allowable pressure) $P_{lim}$ or less of a liquid feeding system such as a pump, a pipe, or a connector, and a seal member such as an O-ring.

The mixing/reaction section 32 causes mixing or reaction between the liquids L1 and L2 distributed by the distribution section 30 in a mixing/reaction channel 66 formed in the plate 22.

Figure 4:
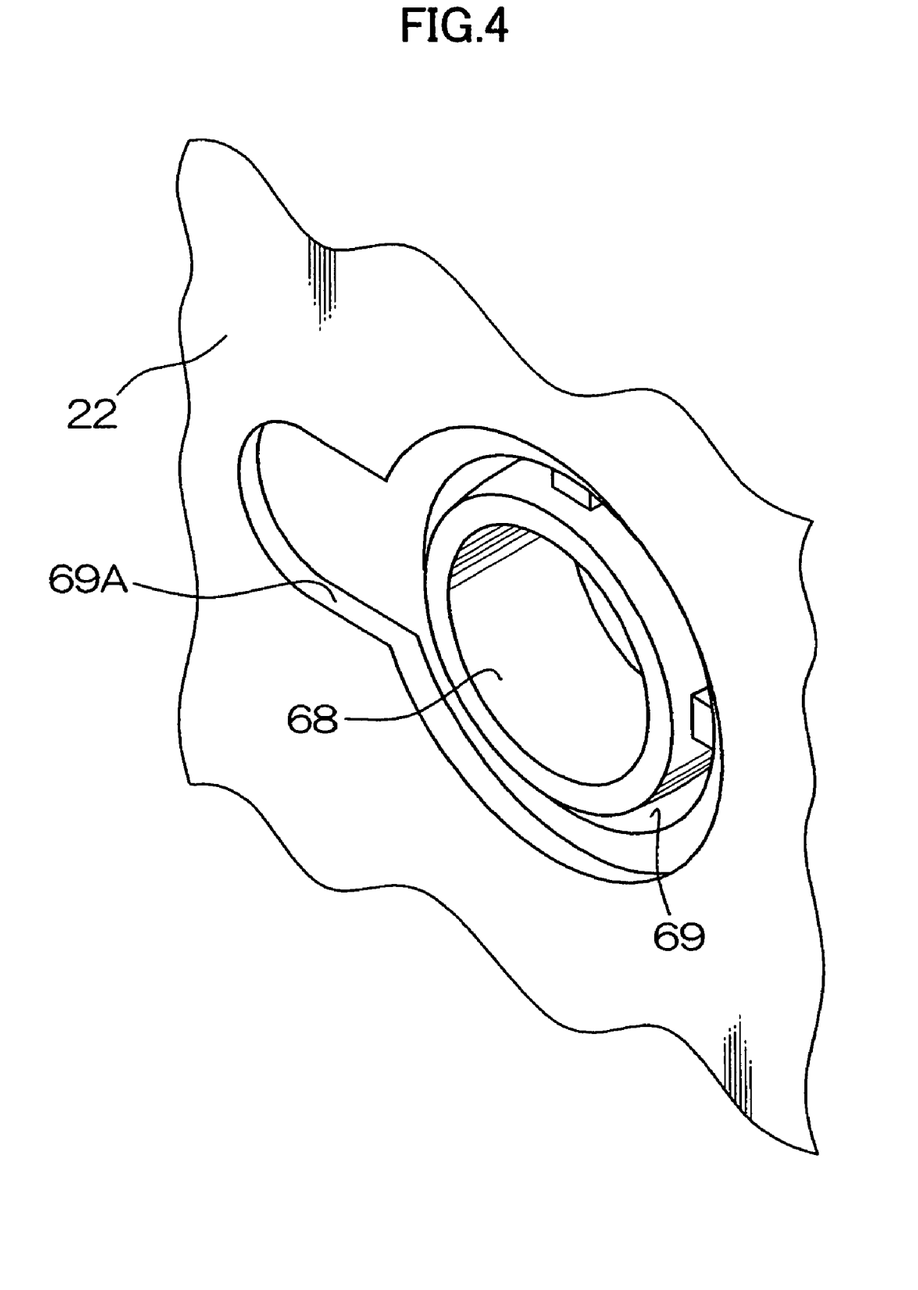
FIG. 4 is a partial perspective view of the mixing/reaction section in FIG. 3.

FIG. 4 is a partial perspective view of a converging section on a surface of the plate 22 facing the plate 20 in the mixing/reaction section 32 in FIG. 3. As shown in FIG. 4, in the surface of the plate 22 facing the plate 20, a first converging channel 68 communicating with the distribution holes 62 ... is formed in a thickness direction of the plate 22. A second converging channel 69 of a cylindrical shape with a slit, and a radial channel 69A communicating with the second converging channel 69 and the distribution holes 64 ... are formed around the first converging channel 68. A sectional area of the radial channel 69A is set so as not to be bottleneck. The first and second converging channels 68 and 69 communicate with the mixing/reaction channel 66 passing through the plate 22 in the thickness direction.

Collection channels 72 ... are formed that provide communication between terminal ends of the mixing/reaction channels 66 ... and the center of the surface of the plate 22 facing the plate 24.

The mixing/reaction channel 66 is preferably configured so as to obtain a Reynolds number Re of 2300 or less, and more preferably configured so as to obtain purity and a yield required for mixing and reaction and be produced at low costs.

A circle equivalent diameter in a radial section of the mixing/reaction channel 66 is preferably 10 mm or less, more preferably 1 mm or less, and further preferably 500 µm or less. A length of the mixing/reaction channel 66 is preferably sufficient to finish the mixing or reaction, and can be set according to kinds of mixing or reaction. In the embodiment, the circle equivalent diameter in the radial section of the mixing/reaction channels 66 ... is 300 µm.

As shown in FIG. 3, one through hole 74 through which the collected reaction product LM flows out is formed at the center of a surface of the plate 24 in the outflow section 34. This allows the reaction product LM to be collected as one fluid.

In the plates configured as described above, positioning holes 78 ... are commonly formed that fit a high precision screw (not shown) having a body that is a substitute of a positioning pin. The screw passes through the positioning holes 78 ... with high precision, thereby allowing relative positioning of the plates and allowing the plates to be fastened and assembled. The positioning holes 78 ... are provided asymmetrically between the surfaces of the plates. Specifically, phases of the positioning holes 78 are provided at irregular pitches. Further, marks indicating kinds or the stacking order of components, stacking phases, a stacking direction, or the like are formed in the plates. This prevents production errors such as an error in the orientation of the plates when the plates are stacked and integrated.

As shown in FIG. 3, O-rings 79 are preferably provided around the channels formed in the plates and inside the positioning holes 78 ... This allows the plates to be stacked and integrated with high sealing properties. The O-rings 79 may be omitted by finishing the surfaces of the plates with high precision (smoothness, flatness, or the like) and removing burrs from channel end surfaces.

The plates are preferably made of material having high strength and corrosion resistance, and increasing fluidity of fluids. For example, metal (iron, aluminum, stainless steel, titanium, hastelloy, or other various kinds of metal), resin (fluororesin, acrylic resin, PS, PP, or the like), glass (quartz), ceramic (silicon, or the like), alumina, or the like can be favorably used.

Micromachining is used to produce the fluid mixing apparatus 10. Usable micromachining includes, for example, as partially described above, LIGA (Roentgen-Lithographie Galvanik Abformung) using X-ray lithography, high aspect ratio photolithography using EPON SU-8 (trade name), micro electro discharge machining (µ-EDM), high aspect ratio machining of silicon by Deep RIE (Reactive Ion Etching), hot embossing, stereolithography, laser machining, ion beam machining, mechanical micro cutting using a micro tool made of hard material such as diamond. These techniques may be used alone or in combination. Preferable micromachining is LIGA using X-ray lithography, high aspect ratio photolithography using EPON SU-8, micro electro discharge machining (µ-EDM), and mechanical micro cutting.

A bonding method of the members including the plates is preferably a precise method keeping dimensional accuracy without damage to the channels caused by degradation or deformation of material from heat, and preferably selected from solid phase bonding (such as pressure bonding or diffusion bonding) or liquid phase bonding (such as welding, eutectic welding, soldering, or adhesion) in view of material. For example, the method includes direct bonding using an intermolecular force on surfaces of members such as silicon direct bonding for bonding silicon and silicon when silicon is used as material, fusion welding for bonding glass and glass, anode bonding for bonding silicon and glass, diffusion bonding for bonding metal and metal, or the like. Bonding of ceramic requires a bonding technique other than mechanical sealing for metal, and a method can be used for printing alumina with glass solder as a bonding agent to a thickness of about 80 µm by screen printing, and performing heat treatment at 440° C. to 500° C. without application of pressure. A new technique includes surface activation bonding, direct bonding using hydrogen bonding, and bonding using HF (hydrogen fluoride) solution. The surface activation bonding is room-temperature direct bonding of irradiating members with argon ion beams in a vacuum to clean surfaces of the members at the atomic level and performing pressure bonding at room temperature. This method can reduce an influence of thermal deformation of the members, and particularly, can reduce thermal stress when members of different materials are bonded. Besides the above described bonding methods, an adhesive may be used.

In the embodiment, the microchannels are formed using SUS with high durability by micro drilling and micro electro discharge machining. As the method for stacking and integrating the plates, the method for integrating the plates by passing the screw through the positioning holes 78 ... is used as described above, but the plates may be integrated by the above described various bonding methods. This allows the O-rings 79 to be omitted, and the device can be used for fluids that rot rubber material.

As a fluid supply device, various micro pumps, diaphragm pumps, continuous flow type syringe pumps may be favorably used. The continuous flow type pump uses a method for filling the entire channels that constitute the fluid mixing apparatus 10 with the liquid L1 or L2, and driving the entire liquids with a fluid supply device prepared outside. Supply pressure and supply flow rates of the liquids L1 and L2 to be supplied to the through holes 36 and 38 can be freely controlled.

A heating device such as a heater, a peltier element or a heat fluid channel, and/or a cooling device such as a refrigerant channel may be integrated into the fluid mixing apparatus 10. This allows the liquids L1 and L2 to be adjusted to an appropriate temperature to increase mixing or reaction efficiency.

The fluid used in the embodiment may include a liquid, a gas, a mixed liquid-solid phase fluid, a mixed gas-solid phase fluid, or the like.

Next, operations of the distribution section 30 and thereafter in the fluid mixing apparatus 10 of the embodiment will be described with reference to FIGS. 3 and 5. The flow directions of the liquids L1 and L2 are shown by arrows.

As shown in FIG. 3, first, the rectified liquid L1 flowing through the concentric annular channel 50 and the rectified liquid L2 flowing through the concentric annular channel 60 inside thereof are distributed into the ten distribution holes 62 ... and 64 ..., respectively. At the time, pressure losses of the liquids L1 and L2 flowing through the ten distribution holes 62 ... and 64 ... are increased by the orifices.

This allows the liquids L1 and L2 to be uniformly supplied to the ten first and second converging channels 68 ... and 69 ... formed in the surface of the plate 22 facing the plate 20.

Figure 5:
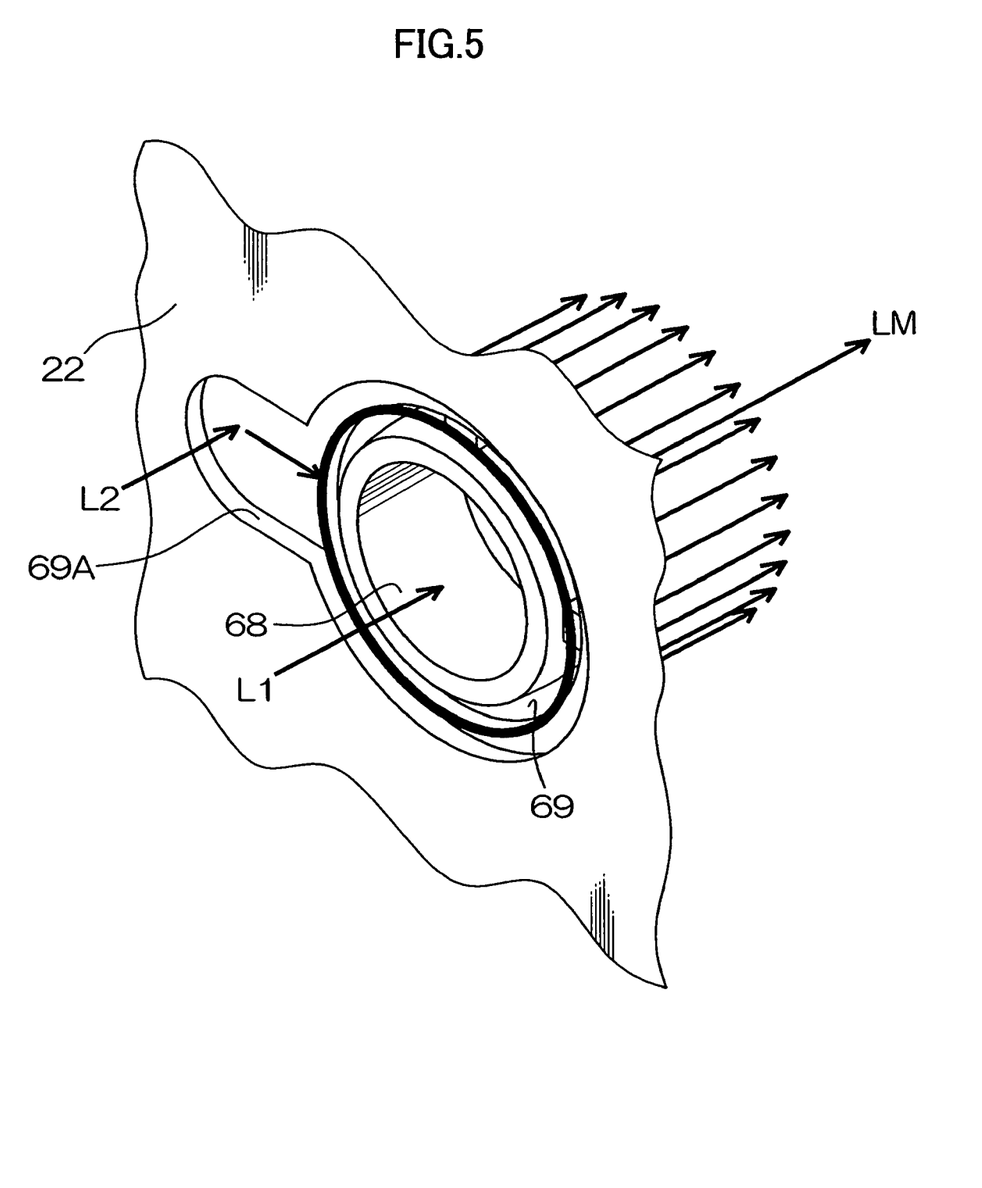
FIG. 5 is a perspective view for illustrating an operation in FIG. 4.

Then, as shown in FIG. 5, the liquid L1 having flowed out of the distribution holes 62 ... flows into the first converging channels 68 ... Similarly, the liquid L2 having flowed out of the distribution holes 64 ... flows through the radial channels 69A ... into the second converging channels 69 ... The flowed-in liquids L1 and L2 are rectified into concentric annular shapes in the thickness direction of the plate 22, then converged in the mixing/reaction channels 66 ..., and mixed or react.

The reaction products LM produced in the mixing/reaction channels 66 ... flow through the collection channels 72 ... formed in the surface facing the plate 24 and then collected into one product.

Then, as shown in FIG. 3, the reaction product LM flows out of the through hole 74 formed at the center of the plate 24.

Thus, according to the present invention, uniform distribution properties of the fluids in numbering-up and air bubble removing properties in the channels can be increased to allow uniform and stable mixing or reaction to be performed.

In the embodiment, the example of causing reaction between two liquids in the fluid mixing apparatus 10 has been described, but the present invention may be applied to the case of causing reaction between two or more fluids.

Figure 6:
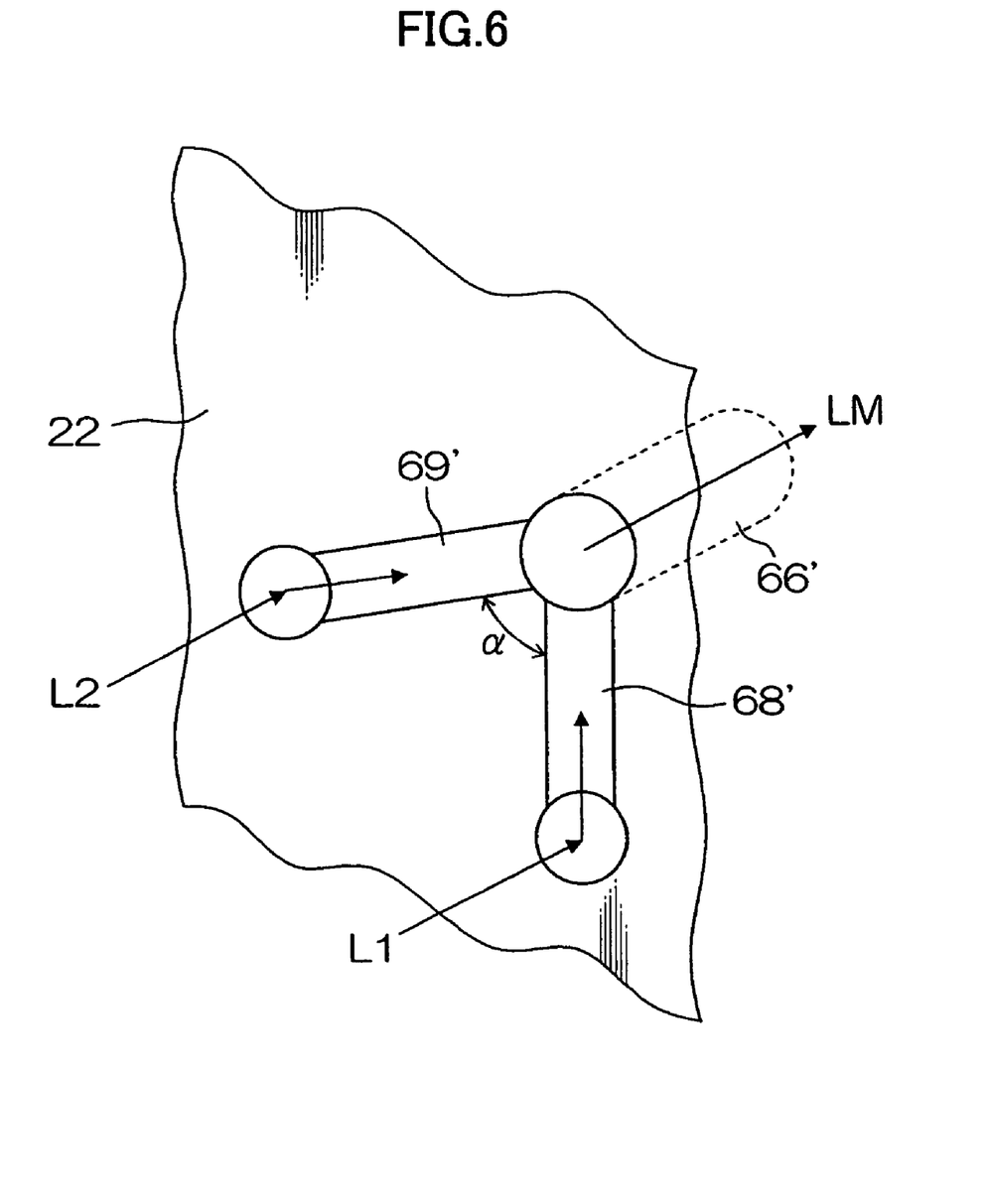
FIG. 6 is a schematic diagram for illustrating another aspect of the mixing/reaction channel in the first embodiment.

Next, a variation of the mixing/reaction channel 66 in the embodiment will be described. FIG. 6 is a schematic diagram for illustrating another aspect of the mixing/reaction channel 66 in the first embodiment.

As shown in FIG. 6, first and second linear converging channels 68' and 69' communicating with the distribution holes 62 ... and 64 ... (see FIG. 3) are formed in the surface of the plate 22 facing the plate 20, and ends thereof are converged so as to form a converging angle α at their center points. The converging section of the first and second converging channels 68' and 69' communicates with a mixing/reaction channel 66' passing through the plate 22 in the thickness direction.

Thus, the liquids L1 and L2 uniformly distributed through the distribution holes 62 ... and 64 ... with increased pressure losses are supplied to the first and second converging channels 68' and 69' to allow uniform and stable mixing or reaction to be performed. In FIG. 6, the converging angle α of the first and second converging channels 68' and 69' can be freely set.

For the mixing/reaction channel 66', a Reynolds number Re and a circle equivalent diameter in a radial section are the same as described above.

Second Embodiment

Figure 7:
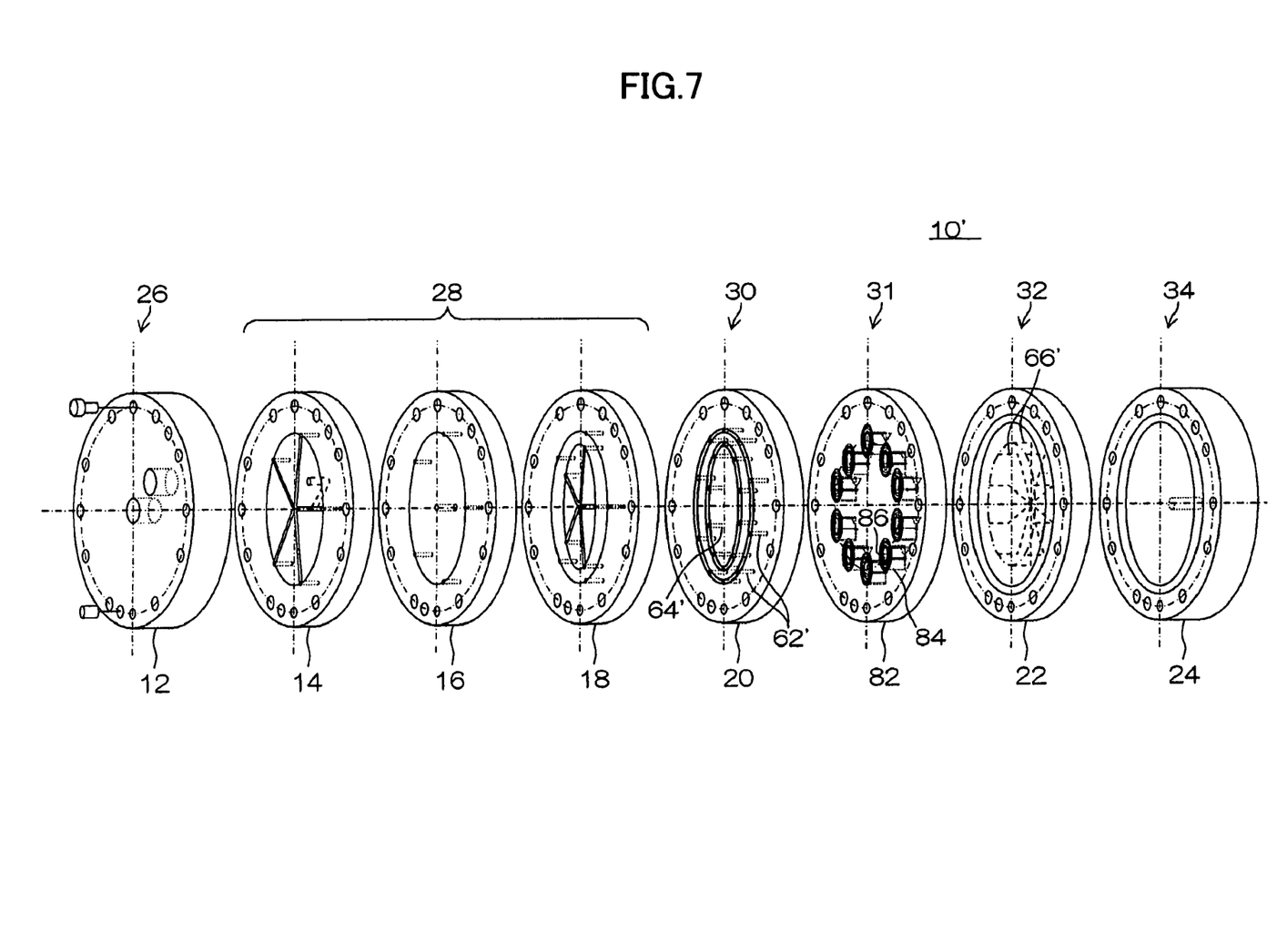
FIG. 7 is an exploded perspective view for illustrating an example of a fluid mixing apparatus according to a second embodiment.

FIG. 7 is an exploded perspective view for illustrating an example of a fluid mixing apparatus 10' of numbering-up type according to a second embodiment. Eight parts that constitute the fluid mixing apparatus 10' are herein shown in exploded perspective view. In this embodiment, an example of a converging section and a mixing/reaction section being formed in different plates will be described. The same members or components having the same functions as the first embodiment are designated by the same reference numerals, and detailed descriptions thereof will be omitted.

The fluid mixing apparatus 10' in FIG. 7 is configured as the first embodiment in FIG. 1 except that plates have circular shapes and a plate 82 is added.

The plate 82 that constitutes a converging section 31 has, in a surface facing a plate 20, ten small concentric annular channels 84 ... and 86 ... communicating with first distribution holes 62' ... and 64' ... that divide concentric annular channels 50 and 60, respectively, into ten parts at regular intervals.

Figure 8:
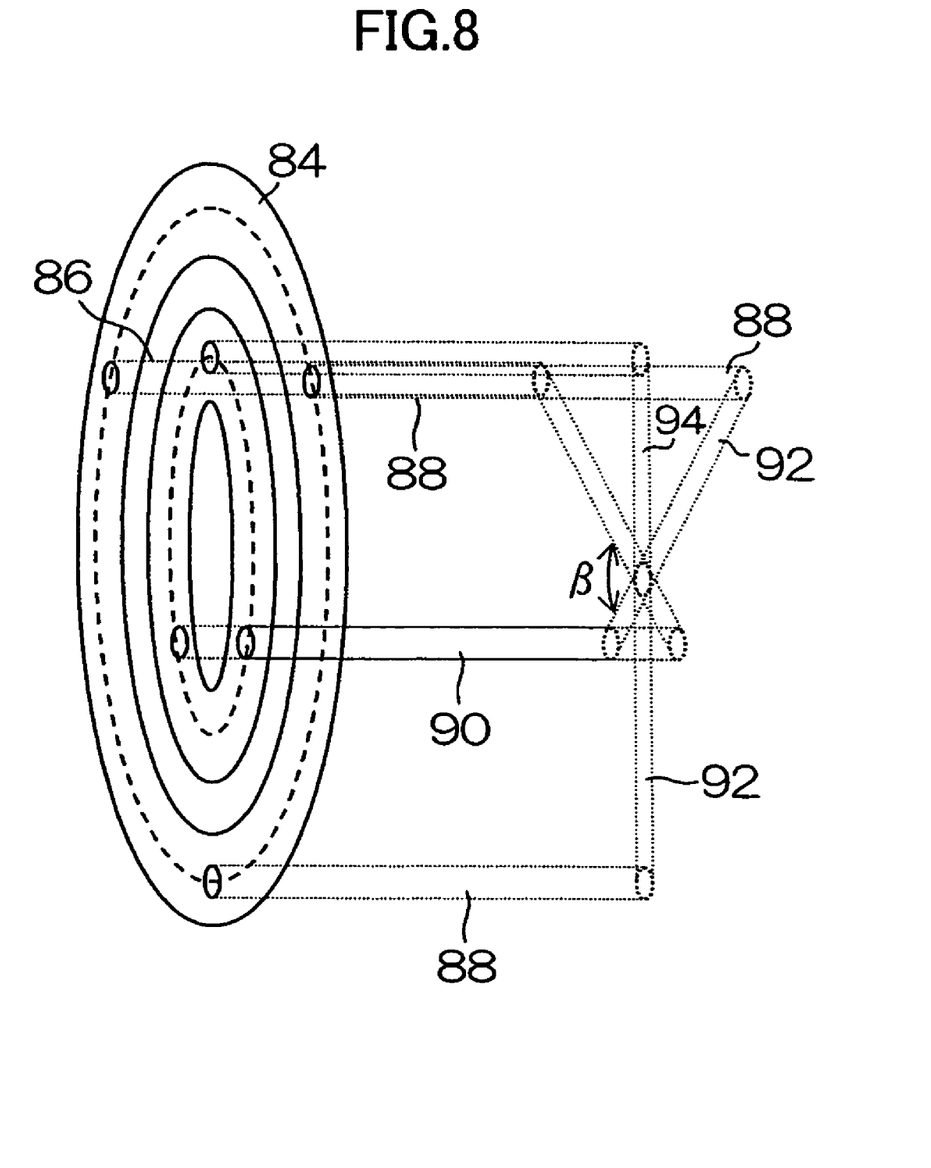
FIG. 8 is a partial perspective view of a converging section in FIG. 7.

FIG. 8 is a partial enlarged perspective view of the concentric annular channels 84 ... and 86 ... formed in the plate 82 of the converging section 31 in FIG. 7. As shown, three distribution holes 88 ... are formed at 120° intervals of a central angle in the concentric annular channels 84 ... so as to pass through the plate 82 in a thickness direction. Similarly, three second distribution holes 90 ... are formed at 120° intervals of a central angle in the concentric annular channels 86 ... so as to pass through the plate 82 in the thickness direction.

A central angle β formed by each of the second distribution holes 88 ... and each of the second distribution holes 90 ... adjacent to each other is preferably 60°. This allows the channels to be formed symmetrically in a flow direction.

In a surface of the plate 82 facing the plate 22, three first converging channels 92 ... having ends communicating with the second distribution holes 88 ... and three second converging channels 94 ... having ends communicating with the second distribution holes 90 ... are formed to be converged at the central position of the plate 82. The central position at which the first converging channels 92 ... and the second converging channel 94 ... are converged communicates with the mixing/reaction channel 66' formed in the plate 22.

As in the first embodiment, pressure loss increasing devices are provided in the first distribution holes 62' ... and 64' ... A preferable pressure loss increasing device is an orifice, but a hole diameter of each of the first distribution holes 62' ... and 64' ... may be simply reduced in size. Kinds of the pressure loss increasing device or a preferable range of a pressure loss $\Delta P$ are the same as in the first embodiment.

A circle equivalent diameter in radial sections of channels and holes formed in plates 12, 14, 16 and 18 in a rectifying section 28, and a circle equivalent diameter in a radial section of the mixing/reaction channel 66' are the same as in the first embodiment.

Materials of the plates, a bonding method and an assembling method of the plates may be the same as in the first embodiment. In this embodiment, silicon wafers are used as the plates, and multiple microchannels are formed on the silicon wafer at once by dry etching or the like. This can increase the number of microreactors formed in one silicon wafer, and facilitate mass production of microreactor units (fluid mixing apparatuses) formed by stacking and integrating the silicon wafers. Particularly, with commercially available standard-size silicon wafers, handling properties of the wafers can be increased, and a technique of stacking and bonding the wafers can be used. The wafers may be bonded by an adhesive, but preferably bonded by direct bonding as described above. For heat bonding, pyrex having substantially the same coefficient of thermal expansion as silicon may be used, but room-temperature direct bonding is preferably used for bonding wafers with different coefficients of thermal expansion.

The microchannels may be formed by wet etching, which may be used for materials other than silicon (for example, SUS). Electro discharge machining can be used for all conductive materials.

Figure 9:
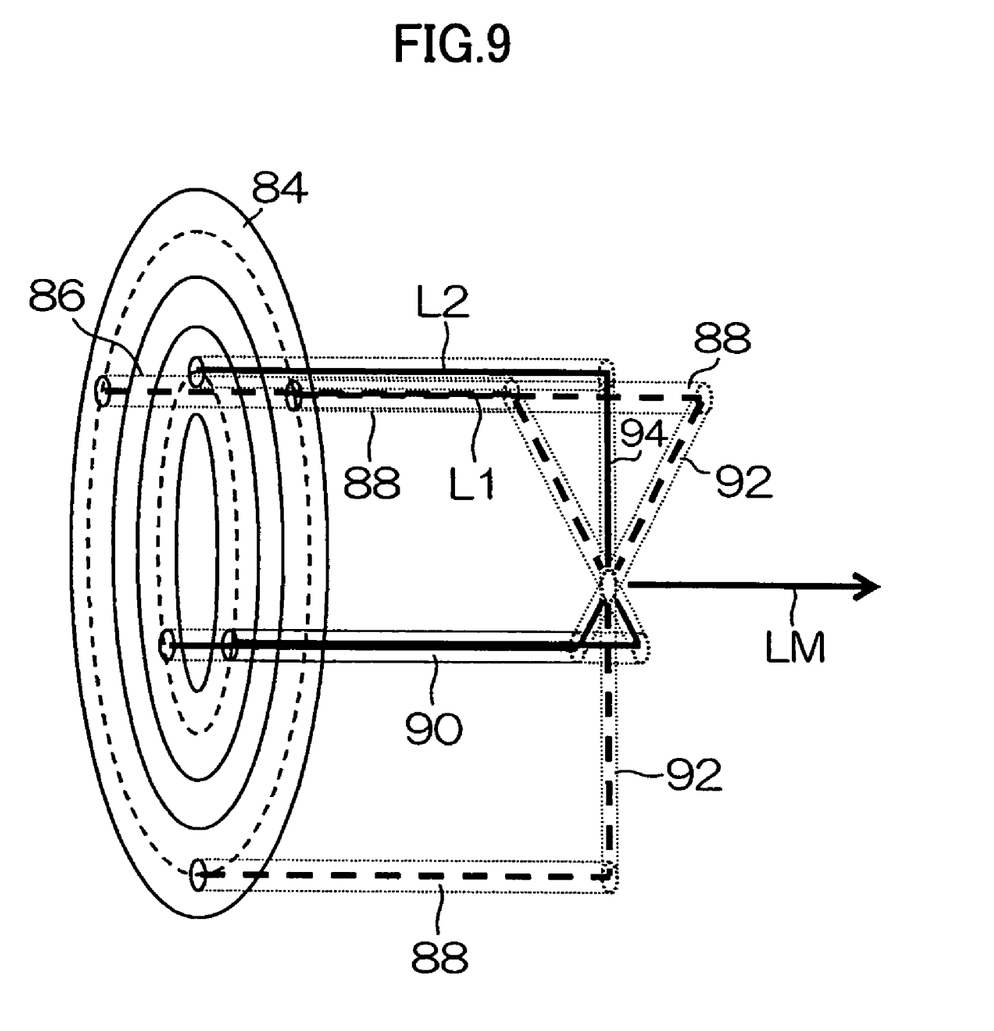
FIG. 9 illustrates an operation in FIG. 8.

FIG. 9 is a partial enlarged perspective view for illustrating an operation in FIG. 8.

As shown, the liquid L1 having flowed out of the first distribution holes 62' flows into the concentric annular channels 84 formed in the plate 82. The flowed-in liquid L1 further flows through the second distribution holes 88 . . . and then flows into the first converging channels 92 . . .

Similarly, the liquid L2 having flowed out of the first distribution holes 64' flows into the concentric annular channels 86 . . . formed in the plate 82. The liquid L2 further flows through the second distribution holes 90 . . . and then flows into the second converging channels 94 . . .

Then, the liquids L1 and L2 flow through the first and second converging channels 92 . . . and 94 . . . , respectively, and then converged at the central position of the plate 82, and flow out into the mixing/reaction channel 66'.

Then, in the mixing/reaction channel 66', mixing and reaction of the liquids L1 and L2 is performed to produce a reaction product LM.

Then, as shown in FIG. 6, the reaction product LM obtained by the mixing and reaction in the plate 22 flows out of the through hole 74 in the plate 24.

The liquids L1 and L2 can be uniformly distributed by increasing the pressure losses in the first distribution holes 62' . . . and 64' . . . of the liquids L1 and L2 before the converging section 31. Further, the pressure losses in the second distribution holes 88 . . . and 92 . . . may be further increased.

The rectified concentric annular flows of the liquids L1 and L2 are distributed into the plurality of small concentric annular flows and converged to allow mixing or reaction to be performed with higher efficiency. The pressure losses in the first distribution holes 62' . . . and 64' . . . when distributing the rectified concentric annular flows into the plurality of small concentric annular flows can be increased to allow the liquids L1 and L2 to be uniformly distributed.

According to the present invention, uniform distribution properties of the fluids in numbering-up and air bubble removing properties in the channels can be increased to allow uniform and stable mixing or reaction to be performed. The device can be continuously stably operated to reduce time for starting the operation or cleaning after the operation.

The embodiments of the fluid mixing apparatus and the fluid mixing method according to the present invention have been described, but the present invention is not limited to the embodiments, and various aspects may be adopted.

For example, in the first and second embodiments, one stage of branch portion is provided for each fluid in the rectifying section 28, but not limited to this, and two or more stages of branch portion may be provided. Similarly, one stage of distribution of each fluid is performed in the distribution section 30, but not limited to this, and two or more stages of distribution may be performed.

The branch number in the rectifying section 28 or the number of distribution holes in the distribution section 30 are not limited to those in the embodiments, but may be set to any number within a range that prevents accumulation of the liquids.

In the first and second embodiments, the channels are placed horizontally, but not limited to this, the channels may be placed vertically. This can provide a uniform pressure balance of the fluids using the gravity.

The present invention may be favorably applied to a numbering-up technique of a microreactor that performs precise chemical reaction, mixing, emulsifying dispersion, or the like.

What is claimed is:

1. A fluid mixing apparatus having a numbering-up mechanism that distributes plural kinds of fluids and concurrently performs multiple mixing or reactions, comprising:
   a rectifying section having a plurality of annular channels that rectify the plural kinds of fluids into respective concentric annular flows wherein each of said plurality of annular channels being in fluid communication with a radial branch structure channel;
   a distribution section having a plurality of distribution channels that distribute the plural kinds of fluids rectified by the rectifying section into a plurality of flows;
   a converging section having a plurality of converging channels that converge different kinds of fluids among the plural kinds of fluids distributed by the distribution section; and
   a mixing/reaction section having a plurality of mixing/reaction channels that cause mixing or reaction of the plural kinds of fluids converged by the converging section,
   wherein a plurality of pressure loss increasing devices are provided in the distribution channels.

2. The fluid mixing apparatus according to claim 1, wherein
   the converging section and the mixing/reaction section are integrally formed.

3. The fluid mixing apparatus according to claim 1, wherein
   the pressure loss increasing device is an orifice.

4. The fluid mixing apparatus according to claim 2, wherein
   the pressure loss increasing device is an orifice.

5. The fluid mixing apparatus according to claim 1, wherein
   the distribution section is provided in multiple stages before the converging section, and the distribution number for one distribution is ten or less.

6. The fluid mixing apparatus according to claim 2, wherein
   the distribution section is provided in multiple stages before the converging section, and the distribution number for one distribution is ten or less.

7. The fluid mixing apparatus according to claim 1, wherein
   the fluid mixing apparatus includes no accumulating portion where the plural kinds of fluids accumulate.

8. The fluid mixing apparatus according to claim 2, wherein
   the fluid mixing apparatus includes no accumulating portion where the plural kinds of fluids accumulate.

9. The fluid mixing apparatus according to claim 1, wherein
a circle equivalent diameter of the said plurality of mixing/reaction channels in the mixing/reaction section is 1 mm or less.

10. The fluid mixing apparatus according to claim 2, wherein
a circle equivalent diameter of the said plurality of mixing/reaction channels in the mixing/reaction section is 1 mm or less.

11. A fluid mixing method for distributing plural kinds of fluids and concurrently performing multiple mixings or reactions, comprising the steps of:
rectifying the plural kinds of fluids into respective concentric annular flows, wherein said rectifying occurs via a plurality of annular channels that rectify the plurality the plural kinds of fluids, and wherein each of said plurality of annular channels is in fluid communication with a radial branch structure channel;
distributing the plural kinds of fluids rectified in the rectifying step into a plurality of flows;
converging different kinds of fluids among the plural kinds of fluids distributed in the distributing step; and
causing mixing or reaction of the plural kinds of fluids converged in the converging step, wherein
a pressure loss of the plural kinds of fluids are increased in the distributing step.

12. The fluid mixing method according to claim 11, wherein
the pressure loss of each of the plural kinds of fluids is the highest when the fluids are distributed into the plurality of flows in the distributing step.

13. The apparatus of claim 1, wherein the radial branch structure channel extends radially outward from an annular center to be in fluid communication with the plurality of annular channels.

* * * * *